United States Patent [19]

Appeltans

[11] Patent Number: 5,552,694
[45] Date of Patent: Sep. 3, 1996

[54] POWER SUPPLY WITH IMPROVED EFFICIENCY, TRANSMITTER COMPRISING SUCH A POWER SUPPLY

[75] Inventor: Koen E. J. Appeltans, Eindhoven, Netherlands

[73] Assignee: U.S. Philips Corporation, New York, N.Y.

[21] Appl. No.: 457,954

[22] Filed: Jun. 1, 1995

[30] Foreign Application Priority Data

Jun. 3, 1994 [EP] European Pat. Off. .............. 94201588

[51] Int. Cl.⁶ ................................. G05F 1/10; G05F 1/40
[52] U.S. Cl. ........................................... 323/222; 323/282
[58] Field of Search ...................... 323/222, 223, 323/266, 282, 284, 285; 363/19, 21, 23, 25

[56] References Cited

U.S. PATENT DOCUMENTS

| | | | |
|---|---|---|---|
| 4,835,454 | 5/1989 | White | 323/222 |
| 4,967,138 | 10/1990 | Obergfell et al. | |
| 5,161,097 | 11/1992 | Ikeda | |
| 5,216,351 | 6/1993 | Shimoda | |
| 5,264,780 | 11/1993 | Bruer et al. | 323/222 |
| 5,386,187 | 1/1995 | Bichler et al. | 323/222 |
| 5,422,562 | 6/1995 | Mammano et al. | 323/282 |

OTHER PUBLICATIONS

"Electronic Design", vol. 40, No. 21, Oct. 15, 1992, pp. 104–116.

*Primary Examiner*—Matthew V. Nguyen
*Attorney, Agent, or Firm*—Bernard Franzblau

[57] ABSTRACT

A power supply comprising a coil a switching transistor for establishing a conduction path between the input terminal and the coil during an on-time and for interrupting the conduction path between the input terminal and the coil during an off-time. A diode is provided for sustaining a conduction path for the current through the coil (20) upon interruption of the conduction path between the input terminal (20) and the coil and an apparatus is provided for varying the ratio between the on-time and the off-time of the switching transistor in response to a difference between an output voltage across the load and a first reference voltage (VI). The power supply exhibits an improved efficiency by maintaining the ratio constant if the output voltage lies between two reference values. Within this voltage window defined by the two reference values the power supply is self-regulating, as a result of which the control may be disabled so that the efficiency is improved.

17 Claims, 4 Drawing Sheets

POWER SUPPLY WITH IMPROVED EFFICIENCY, TRANSMITTER COMPRISING SUCH A POWER SUPPLY

BACKGROUND OF THE INVENTION

This invention relates to a power supply comprising:

an input for receiving an input voltage, and an output for connecting a load, a coil, switching means for establishing a conduction path between the input terminal and the coil during an on-time and for interrupting the conduction path between the input terminal and the coil during an off-time, means for sustaining a conduction path for the current through the coil upon interruption of the conduction path between the input terminal and the coil, variation means for varying the ratio between the on-time and the off-time of the switching means in response to a difference between an output voltage across the load and a first reference voltage.

Such a power supply is generally suitable for supplying an output voltage to a load, which voltage is maintained at a desired value.

The invention further relates to a transmitter comprising a power output stage having a power supply terminal coupled to a controllable power supply for controlling the power of said power output stage in response to a power control signal.

Such a power supply is known from Electronic Design, Vol. 40, No. 21, Oct. 15, 1992, p. 104, which describes a power supply which controls the output voltage in the continuous conduction mode by varying the ratio between the on-time and the off-time of the switching means. Continuous conduction mode means that the current through the coil does not become zero.

A drawback of such a power supply is that if the load varies hardly or not at all and, as a consequence, the output voltage also varies hardly or not the output voltage is yet maintained by controlling the ratio between the on-time and the off-time. This control consumes current in a situation in which no control is necessary, resulting in unnecessary dissipation of power in the power supply. As a result, the efficiency of the power supply is lower than is strictly necessary.

SUMMARY OF THE INVENTION

It is an object of the invention to provide a power supply with an improved efficiency.

To this end, according to the invention, a power supply of the type defined in the opening paragraph is characterised in that the variation means include means for reducing the ratio if the output voltage is larger than the first reference voltage, increasing the ratio if the output voltage is smaller than a second reference voltage whose value is smaller than the first reference voltage and maintaining the ratio constant if the output voltage lies between the first reference voltage and the second reference voltage.

The invention is based on the recognition of the fact that by allowing a variation in output voltage in the continuous conduction mode within a voltage window defined by a first and a second reference voltage the power supplied to the load is automatically adapted to load variations with a constant ratio between on-time and off-time. As a result of this, the ratio control is activated only if large load variations occur, so that the control may be disabled in the case of small load variations and the average current consumed for this control is reduced. This is of particular advantage for practical situations in which a load varies between substantially constant values. An example of this is a radio/cassette player, where the use as a radio forms a small load and the use as a cassette player forms a high load for the power supply. By means of the measures in accordance with the invention a power supply with output voltage control is obtained, which dissipates less power and consequently has a higher efficiency than the known power supply.

An embodiment of a power supply in accordance with the invention is characterised in that the variation means include means for switching over from the continuous conduction mode to a discontinuous conduction mode if the output voltage is larger than the first reference voltage. In a switching cycle in the discontinuous conduction mode the current through the coil is raised to a given value and subsequently reduced to zero, after which the next cycle is not staxted until the output voltage decreases below a limit value. This results in output voltage control by means of pulse frequency modulation. In the case of a small load, control by pulse frequency modulation in the discontinuous conduction mode is more efficient than control in the continuous conduction mode. By switching from the continuous conduction mode to the discontinuous conduction mode it also is possible to give the power supply a high efficiency for small loads and thus to realise a power supply with a large power range and a high efficiency.

A further embodiment of a power supply in accordance with the invention is characterized in that the variation means include means for switching over from the discontinuous conduction mode to the continuous conduction mode if the output voltage is smaller than a third reference voltage after the current through the coil has decreased to zero. If the output voltage falls below the third reference voltage immediately after the current through the coil has become zero, the load is too high and the power supply should be switched to the continuous conduction mode, in which more power can be supplied to the load.

Yet another embodiment of a power supply in accordance with the invention is characterised in that the variation means include means for limiting, in the discontinuous conduction mode, the off-time to a first time interval and reducing the on-time if the output voltage within this first time interval is not smaller than the third reference voltage and if the on-time is not equal to a predetermined value. These steps result in a power supply which provides output voltage control without the ripple on the output voltage having a frequency which produces interference in the audio band in circuits connected to the power supply. For large current pulses the minimum frequency of the current pulses, which cause ripple on the output voltage, is limited. If the on-time has a predetermined small value and, as a consequence, the current pulse has a proportionately small value, the ripple on the output voltage will be so small that a ripple frequency within the audible range is not a problem and frequency limiting is not necessary.

An embodiment of the invention having a self-learning nature is characterised in that the variation means include means for storing the reduced ratio obtained at the transition from the continuous conduction mode to the discontinuous conduction mode. The self-learning nature resides in the reduction of the ratio between on-time and off-time of the continuous conduction mode when the output voltage is too high and switching-over to the discontinuous conduction mode is effected. As a result of this, the power supplied in the continuous conduction mode is better adapted to the load. This will result in less frequent switching between the discontinuous and the continuous conduction mode.

An embodiment having a similar self-learning nature if the output voltage falls below the voltage window is characterised in that the variation means include means for, in the continuous conduction mode, increasing the ratio from a first value to a second value and increasing the first value by an amount smaller than the difference between the first and the second value, if the output voltage is smaller than the second reference voltage, changing the on-time from the second to the first value as soon as the output voltage exceeds the second reference voltage, and interrupting the conduction path between the input terminal and the coil if the output voltage is smaller than the second reference voltage for a second time interval. By increasing the ratio from a first to a second value it is possible to obtain a rapid response to a load increase, for example, by making the second value significantly larger than the first value. If the load is too high, which manifests itself in that the output voltage remains below the second reference voltage for a second time interval, the power supply will disable itself. Since the current can only increase to the maximum extent for a time which is limited to the second time interval an effective current limitation is achieved. As a result, no current sensing is necessary to limit the current through the coil. In the known power supply current sensing is effected by measuring the voltage drop across a resistor through which the current to be measured flows. This resistor dissipates power. Since this resistor can now be dispensed with the efficiency of the power supply increases in comparison with that of a power supply which uses current sensing.

An embodiment of a power supply in accordance with the invention is characterised in that the variation means include:

means for generating clock pulses, storage means for the storage of numbers, which numbers represent numbers of clock pulses, counting means for counting clock pulses and for supplying a stop signal when a given number of clock pulses is reached, voltage comparison means for supplying a comparison signal in response to the comparison of the output voltage with at least one of the first, second and third reference voltages, control means for in response to the stop signal, loading a number from the storage means into the counting means, said number to be loaded being selected from numbers stored in the storage means, in dependence on the previously loaded number and the comparison signal and controlling the switching means depending on the loaded number and the comparison signal.

These steps result in a digital control which when implemented in MOS technology has a low current consumption and is suitable for integration.

An embodiment of a power supply in accordance with the invention having an even better efficiency is charaeterised in that the sustaining means comprise a parallel arrangement of a diode and a switch. Closing the switch in the period in which the diode is conductive eliminates the dissipation of the diode in this period, which improves the efficiency of the power supply.

An embodiment of a power supply is characterised in that at least either the switching means or the switch is a MOS transistor. MOS transistors are suitable for integration and have a low forward resistance. This step results in a power supply which is suitable for integration. Such a power supply can be integrated not only separately, but it can also be integrated together with another circuit on the same semiconductor material, which other circuit may be connected to the power supply.

An embodiment of a power supply according to the invention is characterised in that the power supply comprises means for controlling at least one of said reference voltages by an output voltage control signal. This measure allows an external control of the output voltage of the power supply.

A transmitter comprising a power output stage, having a power supply terminal coupled to a controllable power supply for controlling the power of said power output stage in response to a power control signal according to the invention, is characterised in that said power supply is the power supply of claim 11, and in that said power control signal is the output voltage control signal of said power supply. The power supply according to the invention, having a controllable output voltage, is especially advantageous for use in a transmitter, wherein the output power of a power output stage is controlled through a power control signal. By controlling the output power by adjustment of the supply voltage of the power output stage an efficient power control is obtained.

BRIEF DESCRIPTION OF THE DRAWINGS

The invention will be described in more detail with reference to the accompanying drawings. In the drawings.

In these Figures like elements bear the same reference symbols.

DETAILED DESCRIPTION OF THE DRAWINGS

Figure 1:
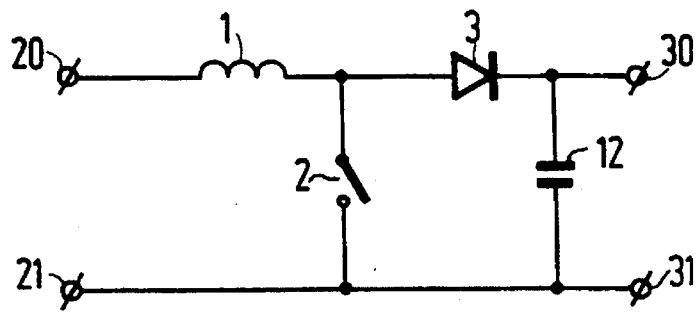
FIG. 1 shows a known boost converter.
Figure 2:
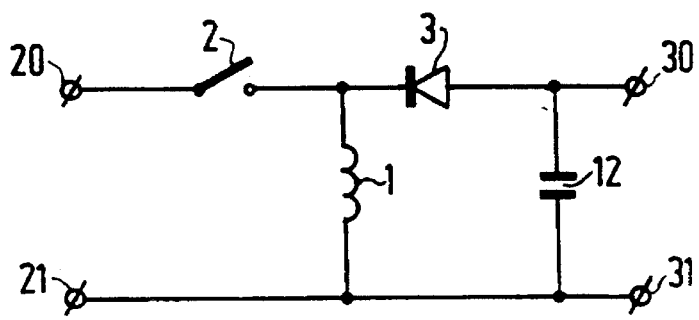
FIG. 2 shows a known buck-boost converter.
Figure 3:
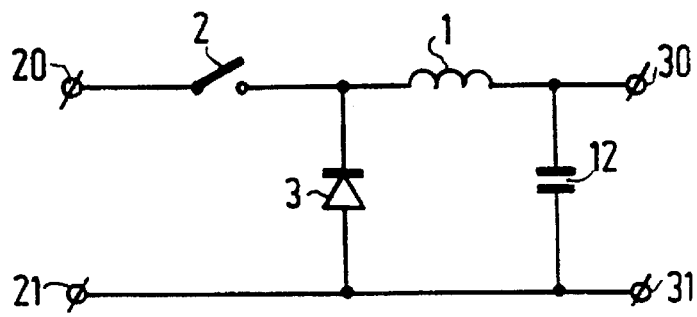
FIG. 3 shows a known buck converter.

FIGS. 1, 2 and 3 show known power supply topologies suitable for use in a power supply in accordance with the invention. In these topologies a T network is constituted by a coil 1, a diode 3 and switching means constructed as a switch 2 in the present case, which T network is arranged between input terminals 20, 21 and output terminals 30, 31, a smoothing capacitor 12 being arranged across these output terminals 30, 31. The boost converter in FIG. 1 has its input terminal 20 coupled to the coil 1 and its output terminal 30 to the cathode of the diode 3, the switch 2 forming the vertical branch of the T and coupled to the input terminal 21 and the output terminal 31. The buck-boost converter in FIG. 2 has its input terminal 20 coupled to the switch 2 and its output terminal 30 to the anode of the diode 3, the coil 1 forming the vertical branch of the T. The buck converter in FIG. 3 has its input terminal 20 coupled to the switch 2 and its output terminal 30 to the coil 1, the diode 3 forming the vertical branch of the T and having its cathode coupled to the coil 1 and the switch 2.

Figure 4:
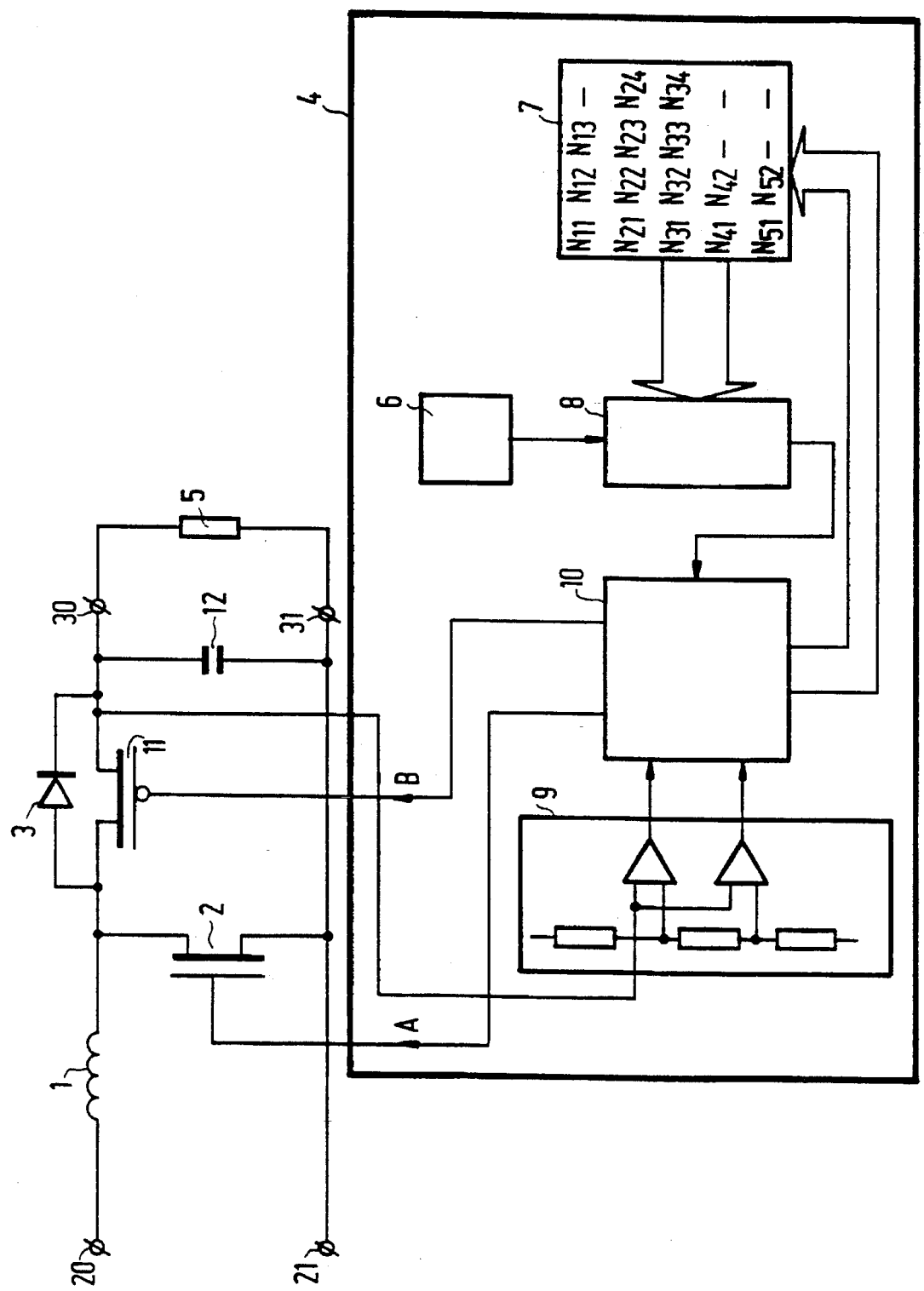
FIG. 4 shows a power supply in accordance with the invention based on the boost converter.

FIG. 4 shows, by way of example, a power supply in accordance with the invention based on the boost converter in FIG. 1. Its topology is suitable for supplying an output voltage higher than the input voltage. The switch 2 is constructed as an NMOS transistor. In the present case the sustaining means are constituted by a parallel arrangement of the diode 3 with an additional switch 11 in the form of a PMOS transistor, which switch 11 is not essential to the present invention. The use of a PMOS transistor instead of an NMOS transistor has the advantage that the gate voltage need not be larger than the output voltage of the power supply in order to turn on this transistor. The power supply also comprises a smoothing capacitor 12, which is arranged across the output terminals 30, 31, and a load 5, which is also arranged across the output terminals 30, 31. The variation means 4 include:

a clock pulse generator 6, which generates clock pulses of a period T, storage means 7, which store numbers $N_{ij}$ having indices i (i=1 . . . 5) and j (1 . . . 4), of which the number $N_{41}$ can be changed by the control means 10. Here, expressed as units of the clock period T, $N_{i1}$ is the on-time of the switch 2;

$N_{i2}$ is the on-time of the switch 11;

$N_{i3}$ is a first waiting time necessary to allow the current through the coil in the discontinuous conduction mode to become zero;

$N_{i4}$ is a second and maximum waiting time in the discontinuous conduction mode;

a down counter 8 for counting clock pulses, which supplies a stop signal when the count becomes zero, a voltage comparison circuit 9, which supplies a comparison signal in response to the comparison of the output voltage with a first reference voltage (V1) and a second reference voltage (V2), the value of the second reference voltage V2 being smaller than the value of the first reference voltage V1, which two reference voltages form a voltage window, control means 10 responsive to the stop signal to load a number from the storage means 7 into the down counter 8 and to control the switches 2 and 11 depending on the loaded number. The control means 10 include a state counter and a phase counter, which keep count of, respectively, the instantaneous state i and the instantaneous phase $\phi_{ij}$ of the state i of the power supply. The count i of the state counter can assume the value 1, 2, 3, 4 or 5. In the states i=1, 2, 3, which correspond to the discontinuous conduction mode, the count j of the phase counter runs from 1 to 4, after which it returns to 1. In the states i=4, 5, which correspond to the continuous conduction mode, the count of the phase counter changes from 1 to 2 and subsequently returns to 1. The control means 10 control the count i of the state counter in such a manner that:

in the states 1, 2, 3 at the end of:

the phase $\phi_{i3}$ it is incremented by 1 if at the end of the phase $\phi_{i3}$ the output voltage is smaller than the first reference voltage V1;

the phase $\phi_{i4}$ it is decremented by 1 in the states i=2, 3 if the down counter 8 reaches the zero count;

in the state 4 at the end of phase $\phi_{i2}$:

it is decremented by 1 if the output voltage is larger than the first reference voltage V1;

it is incremented by 1 if the output voltage is smaller than the second reference voltage V2;

in the state 5 at the end of the phase $\phi_{i2}$ it is decremented by 1 if the output voltage is larger than the second reference voltage V2. In the case of a change of the count i of the state counter the count j of the phase counter becomes 1. In all the other eases the count i of the state counter remains unchanged and the count j of the phase counter is incremented by 1 at the end of each phase unless the maximum value (4 in the states 1, 2, 3 and 2 in the states 4, 5) had already been reached, in which case the count j becomes 1.

With the aid of the counts i and j of the two counters the control means 10 select a number $N_{ij}$ at the beginning of each phase, which number is subsequently loaded into the down counter 8. The count of the down counter 8 is now decremented by 1 after each clock period until the zero count is reached. After this, the down counter 8 stops and generates a stop signal, which also indicates the end of the phase $\phi_{ij}$. Exceptions to this are the phases $\phi_{i4}$ with i=1, 2, 3. The phases $\phi_{i4}$ with i=2, 3 are also terminated at the instant at which the output voltage falls below the first reference voltage V1 if this happens before the count of the down counter 8 becomes zero. The phase $\phi_{14}$ has no limitation; this phase ends exclusively at the instant at which the output voltage decreases below the first reference voltage V1. This results in pulse frequency modulation in the states 1, 2, 3 with frequency limiting in the states 2 and 3.

The control means 10 turn on the switch 2 only in the phase $\phi_{i1}$ (j=1) by making the signal A high during the phase $\phi_{i1}$ and turn on the switch 11 only in the phase $\phi_{\alpha}$(j=2) by making the signal B low during the phase $\phi_{i2}$. In the other phases the switches 2 and 11 are turned off by making the signals A and B low and high, respectively. High means substantially equal to the output voltage. Low means substantially equal to zero volts. The object of this is to turn on the switches 2 and 11 in the phase $\phi_{i1}$ and the phase $\phi_{i2}$, respectively, and to keep them turned off in the other phases. The above method is merely an example of how this object can be achieved and is non-restrictive.

The numbers $N_{ij}$ have been chosen in such a manner that a higher power can be supplied to the load in a state with higher number. This is achieved, for example, by selecting the numbers $N_{i1}$ and $N_{i2}$ to be larger as i increases. In addition, the choice of the values of the numbers is influenced, inter alia by the magnitude of the input voltage, the magnitude of the output voltage and the desired switching frequency and the value of the expected maximum and minimum load.

Figure 5:
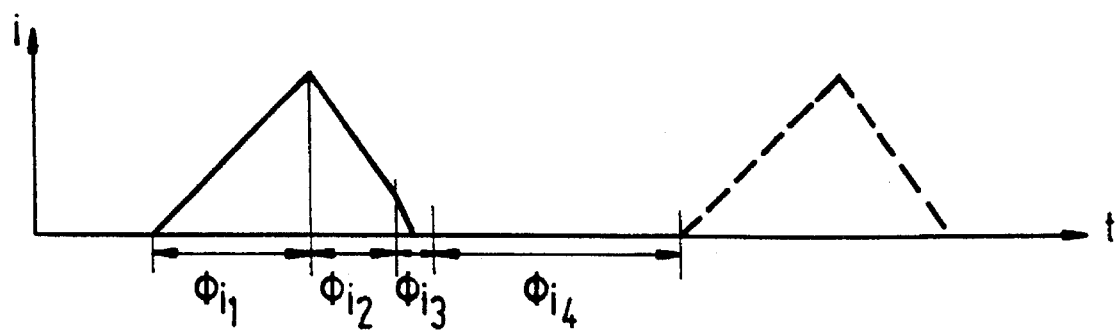
FIG. 5 is a diagram illustrating the operation of a power supply in accordance with the invention during a switching cycle in the discontinuous conduction mode.

FIG. 5 shows a switching cycle in the discontinuous conduction mode (states i=1, 2 and 3), in which the current through the coil 1 is plotted versus time. The states i=1, 2 and 3 differ from one another in that the values Ni1 and Ni2 are larger in a state with a higher number.

In the phase $\phi_{i1}$ the switch 2 is closed and the switch 11 is open, as a result of which the input voltage is applied to the coil 1 and the current through the coil 1 builds up. In the phase $\phi_{i2}$ the switch 2 is open and the switch 11 is closed, as a result of which a voltage with a sign opposite to that of the input voltage and with a magnitude equal to the difference between the input voltage and the output voltage is applied to the coil 1. Since the current through the coil 1 cannot be interrupted just like that it will flow through the switch 11 into the parallel arrangement of the load 5 and the capacitor 12. Since the voltage across the coil 1 is negative the current will decrease. In the phase $\phi_{i3}$ the switches 2 and 11 are both open. The current will now flow through the diode 3 and the load 5 until the current has become zero. The diode 3 ensures that the current cannot become negative. The diode 3 also provides a current path if the switch 2 has just been turned off and the switch 11 has not yet been turned on at the beginning of the phase $\phi_{i2}$. At the beginning of the phase $\phi_{i4}$, i.e. after a time interval $(N_{i2}+N_{i3})*T$ after the switch 2 has opened, the output voltage is compared with the first reference voltage V1. If the output voltage is smaller than the first reference voltage V1 the control means increment the state by 1 and a new switching cycle is started with a longer first phase $\phi_{(i+1)1}$, in which the current through the coil 1 builds up to a larger value. If the output voltage is higher than the first reference voltage V1 a waiting time is observed until the output voltage has decreased below the first reference voltage, after which the phase $\phi_{i2}$ begins and the switching cycle is repeated. If in the states i=2, 3 the output voltage has not decreased below the first reference voltage V1 before the zero count is reached the control means 10 decrement the state by 1 after the down counter 8 has reached the zero count and a new switching cycle is started in a lower numbered state with a shorter first phase $\phi_{(i-1)1}$. In the states i=2, 3 the total waiting time is limited by the down counter 8 reaching the zero count. This means that the maximum duration of the off-time of the switch 2 in the states i=2, 3 is limited to $(N_{i2}+N_{i3}+N_{i4})*T$ and, consequently, the maximum duration of a switching cycle is limited to $(N_{i1}+N_{i2}+N_{i3}+N_{i4})*T$. In this way a minimum switching frequency is obtained. By selecting this minimum switching frequency so as to be situated above the audible frequencies interference which may be caused by switching will not become audible via circuits connected to the power supply. In the state i=1 with a very short on-time of the switch 2 a waiting time is observed until the output voltage falls below the first reference voltage V1, after which a new switching cycle begins with the phase $\phi_{i1}$. In this state no frequency limiting is necessary because the current pulse is so small that no audible interference is produced.

Figure 6:
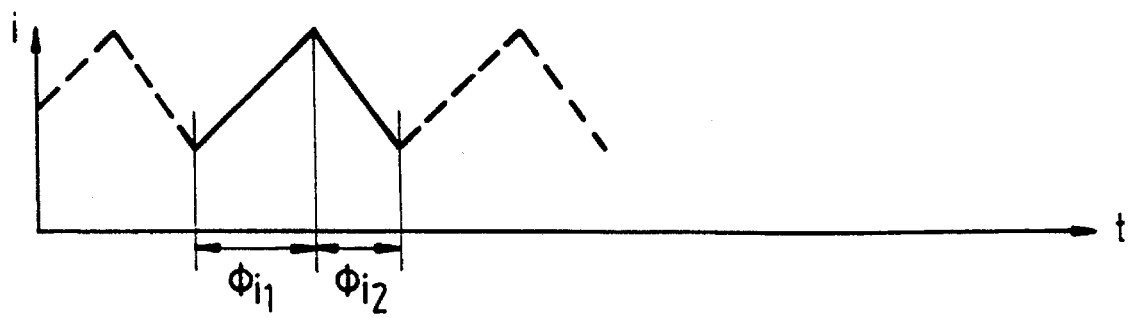
FIG. 6 is a diagram illustrating the operation of a power supply in accordance with the invention during a switching cycle in the continuous conduction mode.
Figure 7:
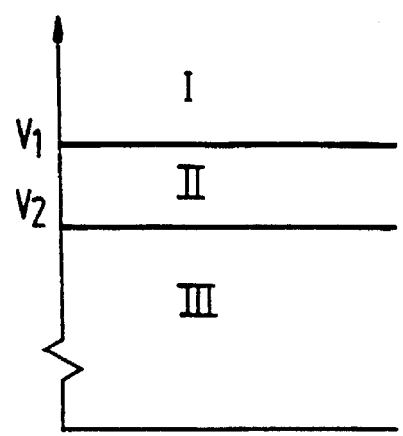
FIG. 7 is a diagram representing the output voltage ranges of the power supply in accordance with the invention and FIG. 8 shows a combination of a boost and a buck converter.

FIG. 6 shows a switching cycle in the continuous conduction mode (states i=4,5), in which the current through the coil 1 is plotted versus time. The phase $\phi_{i1}$ and $\phi_{i2}$ in the states i=4,5 are similar to the phase $\phi_{i1}$ and $\phi_{i2}$ in the states i=1, 2 and 3, and only differ with respect to the values of the associated numbers. In the present case the phase $\phi_{i3}$ and $\phi_{i4}$ are not used because a characteristic feature of the states i=4,5is that no waiting takes place for the current to become zero. A further difference is that the voltage comparison is now effected at the end of the phase $\phi_{i2}$ instead of at the end of the phase $\phi_{i3}$. At the end of the phase $\phi_{42}$ in the state i=4 the control means 10 can switch over to one of the phase $\phi_{31}$, $\phi_{41}$ and $\phi_{51}$, depending on the value of the output voltage, as is shown in FIG. 7. In the range I, where the output voltage is larger than the first reference voltage V1, the control means 10 change over to a lower state i=3 because the power supply supplies too much power to the load 5, as a result of which the output voltage becomes too high. Moreover, the control means 10 decrement the value of $N_{41}$ by 1. By means of this step the on-time in the state i=4 is reduced by one clock period, so that the average current in this state i=4 decreases. As a result, the power furnished by the power supply upon return to the state i=4 will be better adapted to the load, which may preclude repeated switching between the states i=3 and i=4. In the range II, in which the output voltage is within the voltage window defined by the reference voltages V1 and V2, the on-times and off-times and hence $N_{41}$ are kept constant. During the on-time (phase $\phi_{41}$) a constant voltage is obtained across the coil 1 in that the switch 2 is closed. As a result of this, the current through the coil 1 during the phase $\phi_{41}$ will increase substantially linearly as function of time until the switch 2 is opened and the switch 11 is closed in a phase $\phi_{42}$. In the phase $\phi_{42}$ the current through the coil 1 will decrease until the switch 2 is closed and the switch 11 is opened, after which the cycle starts again. The power supplied to the load 5 is the product of the voltage across the load 5 and the current which flows through the load 5 during the on-time of the switch 11. The current decrease is proportional to the output voltage, which means that if the output voltage increases the current will decrease more rapidly than when the output voltage decreases. This is a desired response to a variation in the output voltage because an increasing output voltage is indicative of a smaller load which consumes less current. This provides an output voltage control which compensates for the effect of small load variations on the output voltage without the control being active. The control may now even be disabled, which saves current and, consequently, improves the efficiency of the power supply. This compensation is limited, inter alia, by the magnitude of the voltage window and the switching frequency. In practice, the range within which the output voltage is allowed to vary will be of the order of 100 mV for an average output voltage of, for example, 5 V. Small load variations are still compensated for adequately by a sufficiently high switching frequency (of the order of 100 kHz or higher). In the range III the output voltage has decreased below the second reference voltage V2, which means that with a constant on-time and off-time it is not possible to supply the load 5 rapidly enough with power. Now the state is incremented to i=5, in which the on-time of the switch 2 is prolonged considerably in that the number $N_{51}$ is selected to be larger than the number $N_{41}$. As a result, the avenge current will increase rapidly to supply extra power to the load 5, so that a rapid response to a load increase is obtained. Moreover, the control means 10 increase the ratio between the on-time and the off-time in the state i=4 by extending the on-time, represented by $N_{41}$, by 1 clock period. Since this results in an increase of the average value of the current the power to be supplied is increased, so that the setting of the continuous conduction mode is better adapted to the load 5. Upon a return to the state i=4 this adaptation of $N_{41}$ will require less frequent switching between the states i=4 and i=5. The return to the state i=4 takes place when at the end of the phase $\phi_{52}$ the output voltage again exceeds the second reference voltage V2. Thus, in the state i=5 at the end of the phase $\phi_{52}$ transitions are possible to the phase $\phi_{41}$ and $\phi_{51}$ depending on the value of the output voltage:

if the output voltage is higher than the second reference voltage V2 the state is changed to i=4, if the output voltage is smaller than the second reference voltage V2 the state remains the same. In the state i=5 a limitation can be obtained by counting how many cycles in succession that the power supply is in the state i=5. If this number exceeds a limit value this will be an indication that the load is too high and the power supply cannot deliver the required power. Subsequently, the control means 10 may interrupt the conduction paths. As in the state i=5 the current increases to a maximum extent and this state is limited in time, the limitation of this time also constitutes an effective current limitation. As a result, it is no longer necessary to measure the current for the purpose of limiting the current. A customary method of current measurement is to measure the voltage across a resistor through which the current flows. However, this resistor dissipates power, which adversely affects the efficiency of the power supply. Eliminating the current measurement provides a further improvement of the efficiency of the power supply.

Briefly summarised, this means that:

in the range I a change-over is effected to the discontinuous conduction mode (state i=3) and the ratio between the on-time and the off-time of the state i=4 is reduced, in the range II in the continuous conduction mode (state i=4) nothing is changed, in the range III in the continuous conduction mode (state i=5) the on-time is increased and remains so as long as the output voltage is smaller than the second reference voltage V2 and the ratio between the on-time and the off-time of the state 4 is increased. In the discontinuous conduction mode (states i=1,2,3) the output voltage will always be in the range I. The instant at which the output voltage leaves or tends to leave this range, in conjunction with the instantaneous state, determines whether changing over is required and, if this is the case, to which state. The self-learning nature of the power supply, for a better adaptation of the output power to the load, resides in the reduction or increase of the number $N_{41}$, upon the change-over from the range II to the range I or the range III, respectively.

Figure 8:
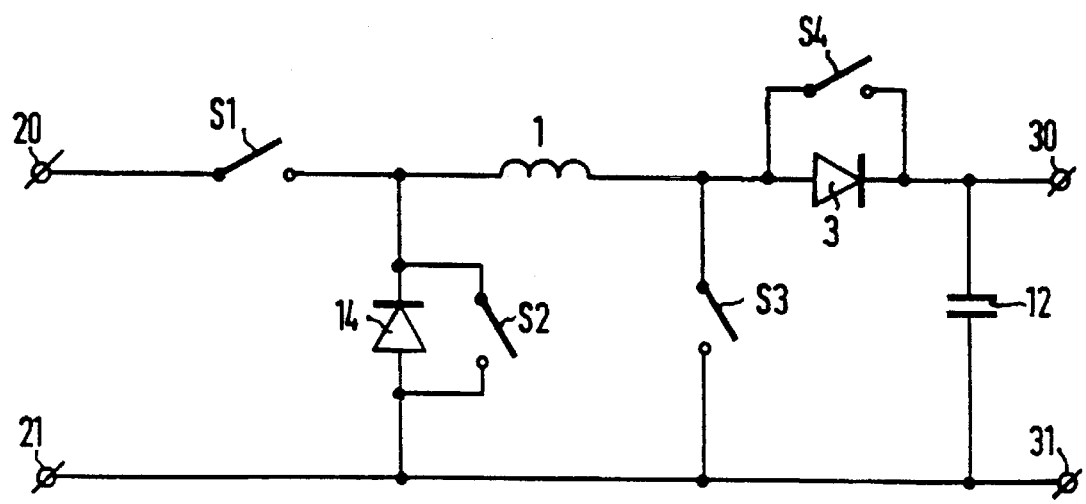

FIG. 8 shows a combination of a boost and a buck converter. Switches S1 and S2 are placed in series between input terminals 20 and 21. Switches S4 and S3 are placed in series between output terminals 30 and 31. A diode 14 is placed in parallel with switch S2, having its anode connected to input terminal 21. A diode 3 is placed in parallel with switch S4, having its cathode connected to output terminal 30. A coil 1 is connected between the connections of the switches S1 and S2 on the one side, and switches S3 and S4 on the other side. A capacitor 12 is connected to the output terminals 30 and 31.

If switch S3 is left open and switch S4 is closed, switches S1 and S2 can be operated as switches 11 and 2, respectively, thereby realising a buck converter as shown in FIG. 3, for down-converting an input voltage applied at the input terminals 20 and 21, to an output voltage, which is lower than the input voltage. If switch S 1 is closed and switch S2 is open, switches S3 and S4 can be operated as switches 2 and 11, respectively, thereby realising a boost converter as shown in FIG. 4, for up-converting an input voltage applied to the input terminals 20 and 21, to an output voltage, which is higher than the input voltage. A further configuration can be obtained by closing switches S1 and S4 and opening switches S2 and S3. Now a "direct" converter is realised, directly coupling the input voltage, applied to input terminals 20 and 21, to the output terminals 30 and 31. Depending on the available input voltage and the required output voltage, the circuit of FIG. 8 can be switched over from one configuration to another for delivering the required output voltage, which is independent of the available input voltage.

A switch-over between the three possible configurations can be based on a comparison of the input and output voltages. If the input voltage is larger than the output voltage, the circuit will be configured as a buck converter. If the input voltage is substantially equal to the output voltage, the circuit will be configured as a direct converter. If the input voltage is lower than the output voltage, the circuit will be configured as a boost converter.

Another method for determining a switch-over between the three possible configurations can be based on a measurement of the duty cycle. If the value of the duty cycle exceeds or drops below a predetermined value, a switch-over from one configuration to the other is effectuated. For example, when in the buck converter configuration the duty cycle exceeds a predetermined value (for example 95%) in state i=4, this means that the power supply has difficulty in maintaining the output voltage at its desired value. Now the configuration will be switched to the direct converter. If the output voltage remains within the window, determined by reference voltages V1 and V2, this configuration is maintained. However, when the output voltage becomes lower than the lower reference voltage V2, the converter is switched to the boost converter configuration. If the output voltage in the direct converter mode rises above the higher reference voltage V1, the converter is switched to the buck converter configuration. Thus in the direct converter configuration, a switch-over to one of the other configurations can be based on solely on the value of the output voltage. When in the boost converter configuration, the duty cycle drops below a predetermined value, for example 5%, a switch-over to the direct converter configuration is effectuated.

It is also possible to determine a switch-over based on a combination of measuring of the duty cycle and comparing the input and output voltages.

Thus a converter is realised, which adapts its configuration to the available input voltage, for producing a constant output voltage, which is independent of the input voltage. In this way the same circuit can be used for a wide range of input voltages. For example, when confronted with a steadily decreasing input voltage, the output voltage can be maintained at its desired level by switching over from the buck converter to the direct converter and eventually to the boost converter. This is especially advantageous in applications, wherein the input voltage is supplied by a battery, which is slowly drained.

The power supply according to the invention can be easily adapted to deliver a variable or controllable output voltage across its output terminals 30 and 31. This can be arranged by making the first and second reference voltages V1 and V2 dependent on an output voltage control signal. For example, by making the reference voltages V1 and V2 proportional to a further reference voltage, which reference voltage is made variable, the variation means will ensure that the output voltage will remain in the window, determined by reference voltages V1 and V2, in states 4 and 5, and close to reference voltage V1 in states 1, 2 and 3 in the way as described previously. As these reference voltages V1 and V2 are proportional to the further reference voltage, the output voltage will be proportional to said further reference voltage. To the skilled person there are many ways to realise said dependency. It is possible to make both reference voltages V1 and V2 proportional to the further reference voltage, so that the window size is also proportional to the further reference voltage. It is also possible to arrange this dependency in such a way that the window size remains constant and independent of the further reference voltage.

A power supply having a controllable output voltage can be used in numerous applications. A possible application is the use of the power supply for feeding a power output stage of a transmitter. By varying the supply voltage of said power output stage, the output power of the transmitter is varied accordingly. Normally the output power of the power output stage is controlled by varying a bias current in a transistor amplifier stage, but this results in low efficiency at low output power. A power control through a control of the supply voltage of the power output stage has as a main advantage that the efficiency of the power output stage remains high even if power is reduced. The use of a power supply for controlling the supply voltage of the power output stage of a transmitter is especially advantageous if the transmitter is battery-fed, as an increased efficiency results in a longer battery lifetime. Such a transmitter can be found in a mobile station according to the GSM standard. Such a mobile station comprises a receiver and the transmitter and is used as a cordless telephone. During a telephone call the mobile station is in wireless communication with a base station, said base station being coupled for example to the telephone lines. In the GSM standard a special "mobile station power control" message is provided in the signalling from the base station to the mobile station. With this message the base station can tell a mobile station to set its output power at a certain level, dictated by the base station. In a mobile station comprising a power supply having a controllable output voltage for supplying a supply voltage to a power output stage of a transmitter incorporated in the mobile station, the "mobile station power control" message can be used for deriving an output voltage control signal for said power supply. Thus the output power of the transmitter can be set by setting the output voltage control signal to an appropriate level, in correspondence with the "mobile station power control" message. By using a power supply according to the invention for feeding a power output stage of a mobile station, a more power-efficient mobile station is realised, resulting in a significantly longer time between consecutive chargings or replacements of the battery of the mobile station.

The embodiment disclosed herein is merely given as an example of the invention and is not intended as a limitation. Many variants, which essentially do not depart from the idea of the invention, will be obvious to the expert. For example, the variation means 4 shown in FIG. 4 may also be used in conjunction with the converters shown in FIGS. 2 and 3, in which case the numbers $N_{ij}$ are adapted in an appropriate manner. The values of the numbers $N_{ij}$ in the embodiment as shown in FIG. 4 may be adapted to the frequency range in which the power supply operates and to the load. Moreover, the number of states need not be limited to 5. This number may be increased or reduced depending on the envisaged load variations and the desired control characteristic. In principle, the lengths of the phase $\phi_{i1}$ and $\phi_{i2}$ can also be limited by means of current measurement. The phase $\phi_{i3}$ may then be dispensed with. The ratio between the on-time and the off-time can be changed by influencing the limiting value of the current on the basis of the comparison of the output voltage with the first and the second reference voltage. Furthermore, the control means may alternatively be of an analog type. The reference voltage for the states i=1, 2, 3 need not be equal to the first reference voltage V1 but may alternatively have a value which lies, for example, between the first reference voltage V1 and the second reference voltage V2. The extension or reduction of the on-time, represented by the number $N_{41}$, in the state 4 is not intended as a limitation. It is also possible to reduce or extend the off-time, represented by the number $N_{42}$, or to change both numbers, provided that the ratio between the on-time and the off-time is changed correctly. The switches 2 and 11 may be constructed as MOS or bipolar transistors, so that the power supply can be integrated simply. If desired, the second switch 11 parallel to the diode may be dispensed with, thereby enabling the phase $\phi_{i2}$ and $\phi_{i3}$ in the states 1, 2 and 3 to be combined into single phase.

I claim:

1. A power supply comprising:
   an input terminal for receiving an input voltage, and an output for connecting a load,
   a coil,
   switching means for establishing a conduction path between the input terminal and the coil during an on-time and for interrupting the conduction path between the input terminal and the coil during an off-time,
   means for sustaining a conduction path for a current through the coil upon interruption of the conduction path between the input terminal and the coil,
   variation means for varying the ratio between the on-time and the off-time of the switching means (2) in response to a difference between an output voltage across the load (5) and a first reference voltage (V1),
   wherein the variation means (4) include means for
      reducing the ratio if the output voltage is larger than the first reference voltage (V1),
      increasing the ratio if the output voltage is smaller than a second reference voltage (V2) whose value is smaller than the first reference voltage (V1),
      maintaining the ratio constant if the output voltage lies between the first reference voltage (V1) and the second reference voltage (V2).

2. A power supply as claimed in claim 1, wherein the variation means include means for switching over from a continuous conduction mode to a discontinuous conduction mode if the output voltage is larger than the first reference voltage (V1).

3. A power supply as claimed in claim 2, wherein the variation means include means for switching over from the discontinuous conduction mode to the continuous conduction mode if the output voltage is smaller than a third reference voltage, after the current through the coil has decreased to zero.

4. A power supply as claimed in claim 2 or 3, wherein the variation means include means for limiting, in the discontinuous conduction mode, the off-time to a first time interval and reducing the on-time if the output voltage within this first time interval is not smaller than the third reference voltage and if the on-time is not equal to a given value.

5. A power supply as claimed in claim 4, wherein the variation means include means for storing the reduced ratio obtained at the transition from the continuous conduction mode to the discontinuous conduction mode.

6. A power supply as claimed in claim 3, wherein the third reference voltage is equal to the first reference voltage (V1).

7. A power supply as claimed in claim 1, wherein the variation means include means for, in a continuous conduction mode,
   increasing the ratio from a first value to a second value and increasing the first value by an amount smaller than the difference between the first and the second value, if the output voltage is smaller than the second reference voltage (V2),
   changing the on-time from the second to the first value as soon as the output voltage exceeds the second reference voltage (V2), and
   interrupting the conduction path between the input terminal and the coil if the output voltage is smaller than the second reference voltage (V2) for a second time interval.

8. A power supply as claimed in claim 1 wherein comprise:

means for generating clock pulses, storage means for the storage of numbers, which numbers represent numbers of clock pulses, counting means for counting clock pulses and for supplying a stop signal when a given number of clock pulses is reached, voltage comparison means for supplying a comparison signal in response to the comparison of the output voltage with at least one of the first (V1), second (V2) and a third reference voltage, and control means for in response to the stop signal,
  loading a number from the storage means into the counting means, said number to be loaded being selected from numbers stored in the storage means, in dependence on a previously loaded number and the comparison signal, and
  controlling the switching means depending on the loaded number and the comparison signal.

9. A power supply as claimed in claim 1, wherein the sustaining means comprise a parallel arrangement of a diode and a switch.

10. A power supply as claimed in claim 9, wherein at least the switching means or the switch is a MOS transistor.

11. A power supply as claimed in claim 1, which further comprises means for controlling at least one of said reference voltages (V1, V2) by an output voltage control signal.

12. Transmitter comprising a power output stage, having a power supply terminal coupled to a controllable power supply for controlling the power of said power output stage in response to a power control signal, wherein said power supply is the power supply of claim 11, and said power control signal is the output voltage control signal of said power supply.

13. A power supply as claimed in claim 2, wherein the variation means include means for limiting, in the discontinuous conduction mode, the off-time to a first time interval and reducing the on-time if the output voltage within said first time interval is not smaller than the third reference voltage and if the on-time is not equal to a given value.

14. A power supply as claimed in claim 2, wherein the variation means include means for storing the reduced ratio obtained at the transition from the continuous conduction mode to the discontinuous conduction mode.

15. A power supply as claimed in claim 4, wherein the third reference voltage is equal to the first reference voltage.

16. A power supply as claimed claim 3, wherein the variation means include means for, in the continuous conduction mode,
  increasing the ratio from a first value to a second value and increasing the first value by an amount smaller than the difference between the first and the second value, if the output voltage is smaller than the second reference voltage (V2),
  changing the on-time from the second to the first value as soon as the output voltage exceeds the second reference voltage (V2), and
  interrupting the conduction path between the input terminal and the coil if the output voltage is smaller than the second reference voltage (V2) for a second time interval.

17. A power supply as claimed in claim 2, which further comprises means for controlling at least one of said reference voltages (V1, V2) via an output voltage control signal.

* * * * *